United States Patent [19]

Wiener et al.

[11] 4,237,852
[45] Dec. 9, 1980

[54] DRESSING TOOL FOR THE GRINDING WHEEL OF A GEAR GRINDING MACHINE

[75] Inventors: Dieter Wiener, Ettlingen; Klaus Koch, Sulzberg; Jürgen Pomp, Kempten, all of Fed. Rep. of Germany

[73] Assignee: Liebherr-Verzahntechnik GmbH, Kempten, Fed. Rep. of Germany

[21] Appl. No.: 942,966

[22] Filed: Sep. 18, 1978

[30] Foreign Application Priority Data

Mar. 17, 1978 [DE] Fed. Rep. of Germany ....... 2811769

[51] Int. Cl.³ .............................................. B24B 53/06
[52] U.S. Cl. ................................. 125/11 R; 51/206 P; 51/287; 51/367; 125/11 CD
[58] Field of Search .................. 51/206 P, 206.5, 367, 51/368, 369, 390, 388, 287; 125/11 R, 11 CD

[56] References Cited

U.S. PATENT DOCUMENTS

| | | | |
|---|---|---|---|
| 533,707 | 2/1895 | Fuller | 51/369 |
| 1,687,661 | 10/1928 | Eaton | 51/206.5 |
| 1,943,457 | 1/1934 | Reed | 51/388 |
| 2,120,624 | 6/1938 | Pearson | |
| 2,351,842 | 6/1944 | Seibold | 51/206 P |
| 2,751,727 | 6/1956 | McAfee | 51/390 |
| 3,602,209 | 8/1971 | Bocker | 51/206 P |

FOREIGN PATENT DOCUMENTS

| | | |
|---|---|---|
| 2533301 | 2/1976 | Fed. Rep. of Germany . |
| 1129202 | 1/1957 | France . |
| 1151043 | 1/1958 | France . |

*Primary Examiner*—Harold D. Whitehead
*Attorney, Agent, or Firm*—Andrus, Sceales, Starke & Sawall

[57] ABSTRACT

A dressing tool for a gear machine grinding wheel has a disc with a notch reproducing the tooth space of the gear ground by the machine. The flanks of the space open radially inward into a bore. A strip coated with diamond granules is removably affixed to the sides of the notch and looped around a clamp bolt in the bore which holds the strip taut. The tool, when dressing the wheel, is guided in the same manner as a gear when being ground.

10 Claims, 7 Drawing Figures

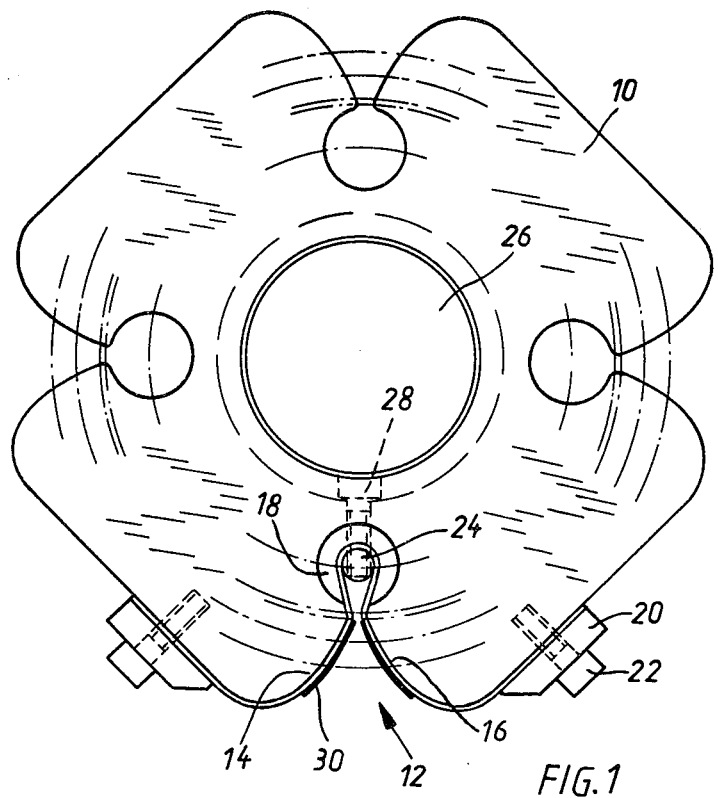
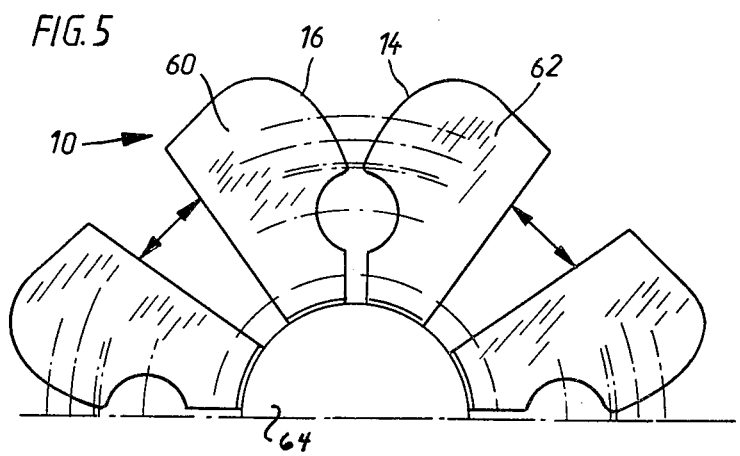

DRESSING TOOL FOR THE GRINDING WHEEL OF A GEAR GRINDING MACHINE

BACKGROUND OF THE INVENTION

1. Field of the Invention

The invention concerns a truing or dressing tool for the grinding wheel of a gear grinding machine for profile grinding plain-toothed or helical spur gears, said truing tool exhibiting truing flanks having the form of a section of a workpiece gear and a strip coated with diamond granules and stretched over said flanks, whereby said truing tool when truing said grinding wheel is guided in the same manner as said workpiece gear when grinding. The truing tool is undersized corresponding to the thickness of the truing strip.

2. Description of the Prior Art

The profile grinding of gears is a method having a number of advantages as compared with the hob grinding method usual up to now. One of these advantages is to be found in the higher metal removal rate which makes possible the shortening of piecework times. The tooth quality of a profile-ground gear is determined among other things by the profile of the grinding wheel, and thus by its truing means. It is already known that the truing tool has the spatial form of a segment of a workpiece gear comprising at least a tooth or a tooth space and that a strip coated with diamond granules covers the truing flanks. For truing the grinding wheel, the tool is guided along the same path of motion as the workpiece gear when grinding. Since in this manner the same contact conditions exist when truing as when grinding, the grinding wheel always receives the desired profile independent of its dimensions.

In order to affix the strip coated with diamond granules to the truing flanks of the tool, it has already been suggested to fasten the strip to the base of the truing flank and to tighten the other end of the strip with a bolt lever which for its part is tiltably supported on the truing tool and whose position is correspondingly fixed by a correcting element. This solution is, however, a disadvantage as far as the arrangement of the bolt lever requires a considerable amount of space so that only a small number of flanks or tooth spaces can be arranged on the circumference of a truing tool exhibiting the spatial form of the workpiece gear. The support and adjustment of the bolt lever requires, furthermore, a cumbersome construction and is awkward to handle.

SUMMARY OF THE PRESENT INVENTION

The object of the invention is therefore to provide a truing tool of the kind described theretofore in which the strips coated with diamond granules can be affixed to the truing flanks in a simple and reliable manner, whereby the affixing means should take up as little room as possible.

In accordance with the invention this object is obtained by reproducing at least one tooth space of the workpiece gear on the circumference of the disc-shaped member. The flanks of the latter open out into a bore situated somewhat below the root circle. The diameter of the bore is larger than the closest distance between the flanks and the flanks change over somewhat above the crown circle into a uniaxially curved surface on the circumference of the disc-shaped member. The strip coated with diamonds is fixed in position, on the one hand, on both sides of the tooth space and, on the other hand, to a clamp bolt arranged with play in the bore, whereby the bolt is held in a position which keeps the strip taut by means of a clamping means. Such a fixture makes it possible to secure a one-part or two-part strip on the flank of even narrow tooth spaces in a simple manner. The length of the flanks is greater than the desired "active flank profile" of the workpiece gear both at the root circle as well as at the crown circle, firstly to provide sufficient room for the attachment of suitable transition surfaces and, if necessary, to permit a change of the root and crown circles of the workpiece gear within certain limits.

The disc-shaped member should preferably have the spatial form of the workpiece gear and should have several tooth spaces arranged on its circumference. After the wear of the truing strips of the tooth space, the tool need only be swivelled to a certain extent until the new tooth space with the unused diamond strips reaches the position of the previous tooth space. Thus, even large series of workpiece gears can be ground without the truing tool having to be changed.

According to a further embodiment of the invention the flanks of the tool are at a tilt to the front surface of the disc-shaped member in accordance with the angle of skew of a helical involute spur gear and the flanks in each case end at the crown and root circles with a generatrix of the flank surface to which a uniaxially curved transition surface is connected. In this case it is an advantage if the transition surfaces exhibit the section of a cylinder jacket. The tooth flank of a helical gear is a ruled surface which is developable. Difficulties arise only at the point of transition from this developable involute surface to the other surfaces. The line of intersection between the involute surface and the base or head cylinder is a helix and therefore spatially curved. Therefore these lines of intersection are not used for connecting the transition surfaces but the generatrix of the involute surface is used instead, i.e. straight lines which form a tangent to a helix on the base circle cylinder. Hence, increasing or decreasing flank lengths result in the direction of the axis of the tool.

According to a further embodiment of the invention, the flanks assigned to a tooth space are arranged on disc segments which can be swivelled around the center axis of the base cylinder either towards each other or away from each other and which can be adjusted for various tooth space distances. Thus, involute toothings with modified profile can be manufactured if necessary. Furthermore, variations of the tooth space width or tooth thickness are possible in the case of adjustments of the angle of contact.

According to a further embodiment of the invention the size of the granules of the strip covered with diamond granules and covering the truing flanks increases from the crown circle in the direction of the root circle. Because of the greater hug between the grinding wheel and the truing tool at the tooth shoulder, the area of the disc engaging farthest into the tooth space is trued more finely in the case of even-sized granules than the areas assigned to smaller grinding wheel diameters. When the workpiece gear is being ground increased danger of surface burning at the tooth root by grinding results due to the more finely trued grinding wheel. This danger of surface burning can be counteracted by means of the measure described theretofore. This measure can be very simply put into practice by coating the strip with two different granule sizes whereby the line of separation between both areas runs at a slope to the strip.

Further embodiments of the invention are characterized in the subclaims.

BRIEF DESCRIPTION OF THE DRAWING

Hereinafter embodiments of the invention are described by means of an example and with the aid of the included drawings. In the drawing FIG. 1 gives a plan view of a truing tool for the manufacture of straight tooth spur gears, FIG. 2 gives a plan view of a truing tool for the manufacture of helical involute spur gears.

FIG. 5 shows a modification of the disc of the truing member in which the spacing of the flanks may be adjusted.

DETAILED DESCRIPTION OF THE PREFERRED EMBODIMENT

Figure 2:
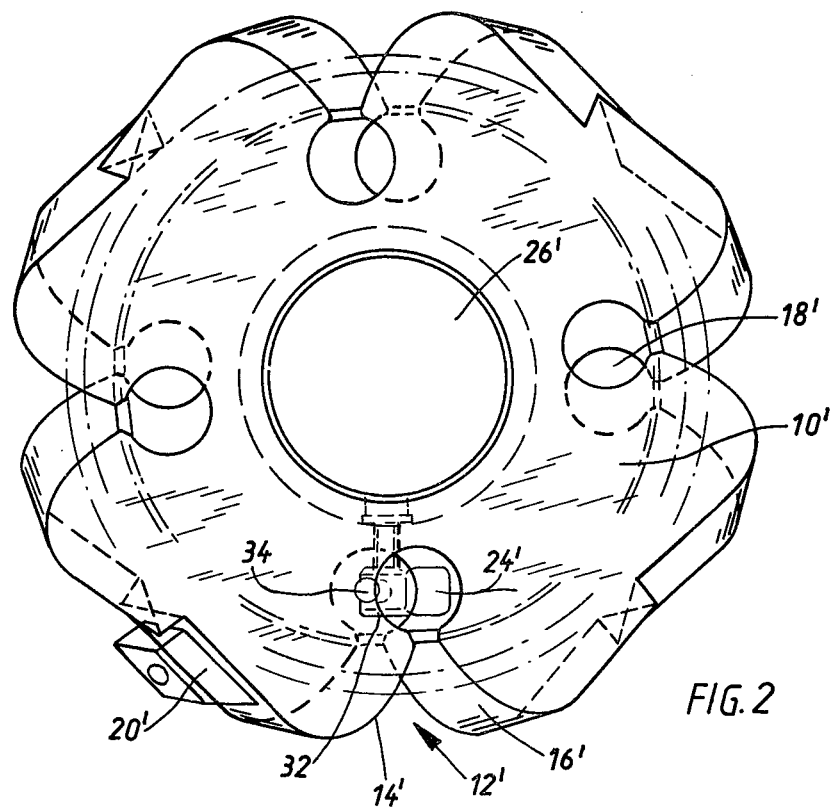
Figure 3:
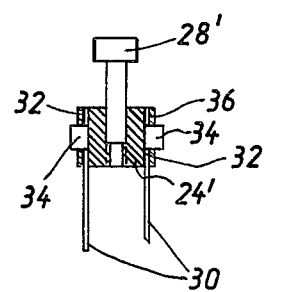
FIG. 3 shows a cross-section of the clamp bolt used in the embodiment according to FIG. 2 and its attachment.

The truing tool shown in FIG. 1 is a disc-shaped member 10 the main dimension of which is slightly larger than the diameter of the workpiece gear which is to be worked by the grinding wheel. The crown circle, the pitch circle, the root circle and the base circle are indicated by a dot-dash line. Around the circumference of the disc-shaped member 10 four tooth spaces 12 are reproduced. The flanks 14, 16, assigned to each of the latter, are involutes to the base circle of the workpiece gear in the case of the embodiment shown. The flanks may also assume any other shape, e.g. cycloids. The number of possible tooth spaces depends on the number of teeth the workpiece gear has. The less teeth the latter exhibits, the larger the tooth spaces must be formed and, correspondingly, the smaller the number of tooth spaces which can be arranged around the circumference of the disc-shaped member 10. The angular distances between the center lines of the tooth spaces 12 need not absolutely be the same as they are in the embodiment example. In the case of an uneven number of tooth spaces it is quite possible to select the angular distance between two tooth spaces 12 so that it differs from the angular distance between the rest of the tooth spaces.

The flanks 14, 16, which are constructed as involutes in the embodiment example shown, exhibit a greater length than is necessary for the "active flank profile" of the toothing. Below the root of the toothing, the flanks open out into a bore 18 the diameter of which is larger than the smallest distance between the flanks. Above the crown of the toothing, the flanks 14, 16, gradually run along the circumference area of the disc-shaped member 10. The thickness of the disc-shaped member 10 is not critical in the manufacture of plain-toothed spur gears; it should, however, preferably correspond approximately to the thickness of the workpiece gear. Cylinder jacket sections are suitable as a transition area between the flanks 14, 16, and the circumference surface of the disc-shaped member 10. On the one hand, the cylinder jacket sections are connected tangentially to the flanks 14, 16 and, on the other hand, tangetially to the circumference surface of the disc-shaped member 10.

On both sides of every tooth space 12 clamping plates 20 are arranged which may be detachedly affixed, e.g. with screws 22, to the circumference surface of the disc-shaped member 10.

A clamp bolt 24 is introduced into the bore 18, the diameter of the former being smaller than the diameter of the the bore 18 so that it can be moved radially within the bore. A tightening screw 28 projects from a slot in the center bore 26 approximately into the center of the bore 18. The middle portion of the clamp bolt 24 exhibits a radial taphole with which the tightening screw 28 becomes engaged. A turning of the tightening screw 28 from the center bore thus causes a displacement of the clamp bolt in a radial direction in the bore 18.

A one-part steel strip 30 which is lined with diamond dust in the area of the flanks, is stretched over the flanks 14, 16, of each of the tooth spaces 12. The two ends of the strip 30 are affixed to the circumference surface of the disc-shaped member 10 by means of the clamping plates 20. The strip 30 runs in a loop around the clamp bolt 24 and exhibits a corresponding opening for the tightening screw 28. After the ends of the strip have been attached by means of the clamping plates 20 the clamp bolt 24 is pulled radially inwards from the center bore 26 by turning the tightening screw 28. The strip 30 is thereby tightly anchored on the flanks 14, 16, of the tooth space 12. The opposite steps are carried out to release or exchange the strip 30.

For truing the grinding wheel, for example the tool instead of the workpiece gear may be mounted on the axis of the latter and may be guided linearly past the grinding wheel so that the outer edge of the grinding wheel becomes engaged in a tooth space 12 and is dressed corresponding to the shape of this tooth space. After the strip 30 of a tooth space 12 becomes worn the tool is merely tilted through 90°. Although only one tooth space 12 is described in detail, it needs no explaining that the other tooth spaces are embodied in the same manner. FIG. 2 shows a truing tool which is suitable for the manufacture of helical spur gears. The basic construction of the tool corresponds to that of the embodiment shown in FIG. 1 and explained heretofore. The corresponding parts have therefore been provided with the same reference numbers to which a stroke has been added.

The tool shown in FIG. 2 is only suitable for truing grinding wheels for helical involute spur gears. The flank surfaces of such gears are developable ruled surfaces produced by tangents to a helix running along the base circle cylinder.

Figure 4:
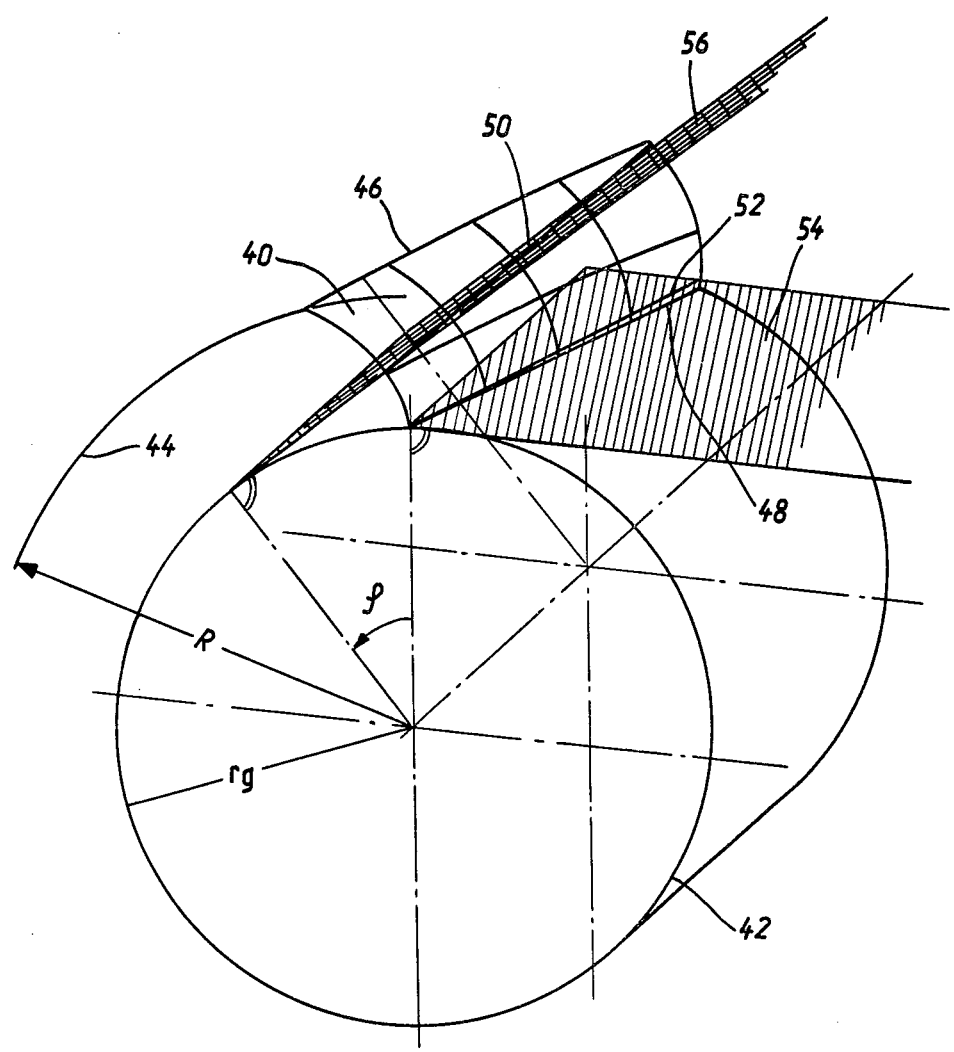
FIG. 4 shows a perspective schematic view of the flank surface of a helical spur gear and the lines of intersection of this flank surface with base and head cylinder.

To explain the position and shape of the flanks 14', 16', reference shall first of all be made to FIG. 4.

Figure 4A:
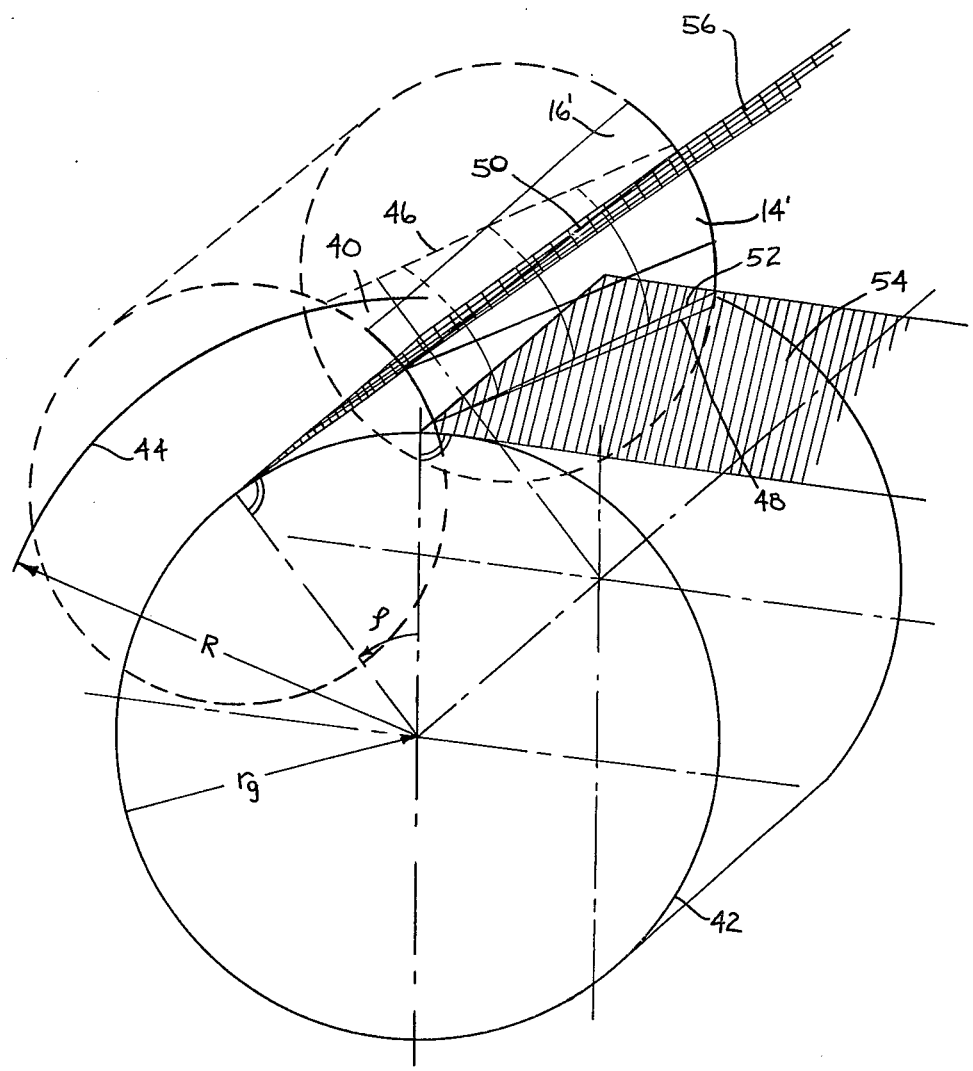
FIG. 4A is a perspective schematic view similar to FIG. 4 further showing the development of the flank surface.

The involute surface 40 is produced by straight lines which form a tangent to a helix 48 on the base cylinder 42. The involute surface 40 is thus developable and may, for example, be covered with a steel band. The lines of intersection of the involute surface 40 with the base cylinder 42 and the crown cylinder 44 are, however, helices 48 or 46 which are not developable on a plane if they form the limitation of a transition surface. The developability of the flank surface with the corresponding transition surface is, however, conditioned on the fact that a steel strip can be drawn over the surface of the flank. Therefore the line of intersection of the involute surface 40 with the corresponding cylinders 42, 44 of the toothing is not selected for limiting the involute surface, as could be first suspected, but the corresponding linear generatrices 50 or 52 of the involute surface 40 instead. The deviation on the base cylinder between the line of intersection (between the involute surface 40 and the base cylinder 42) and the generatrix 52 for the rolling angle $\rho=0°$ is not as great as the difference between the generatrix 50 for the rolling angle $\rho$ and the line of intersection 46 (between the involute surface 40 and the crown cylinder 44). In the example shown the generatrix 50 for the rolling angle $\rho$ is the upper limit of the involute surface 40 to which, for example, a cylinder jacket section may be joined to form a tangent as shown in FIG. 4A. In the case of the embodiment example shown the depth of tooth increases in the axial direction of the gear or tool. The plane of mesh contact for the rolling angle $\rho=0°$ is indicated by 54 and the plane of mesh contact for the rolling angle $\rho$ by 56.

Figure 6:
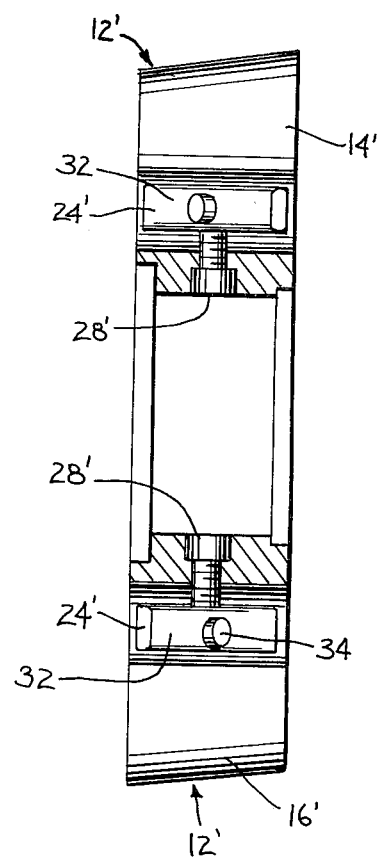
FIG. 6 is a sectional view taken along the line 6—6 of FIG. 2.

In accordance with the geometric relationships outlined in connection with FIG. 4, the flanks 14', 16', of the tooth spaces 12' of the truing tool according to FIG. 2 are at a tilt amounting to the angle of skew between the helical workpiece gear and the front surface. The outer limit of the involute surfaces of the flanks 14', 16', are not parallel axis but tilted at a certain angle to the axis of the tool. As described heretofore this outer limit is formed by linear generatrices to which cylinder jacket sections are joined to form a tangent. Thus, the flank shape illustrated in FIG. 2 in plan view results. FIG. 6 shows the truing tool in cross-section.

The clamp bolt 24' used in the embodiment according to FIG. 2 exhibits two plane surfaces 32 on the side on which cylindrical projections 34 are arranged which engage in corresponding openings on a strip projection from a flank 14', 16' into the opening 18'. In the case of this embodiment the strip 30 is divided into two parts and does not run in the form of a loop around the clamp bolt 24. Due to the engagement of the projections 34 in corresponding holes provided in the ends of the strip a twisting of the ends of the strip against the inner limiting edge of the flank in a certain range is rendered feasible. The ends of the strip may be reinforced in the section containing the holes by means of bonded or soldered reinforcing plates 36. The clamp bolt used in connection with the embodiment according to FIG. 2 may of course also be used in the embodiment according to FIG. 1. The clamping of the two-part strip is carried out in the same manner by tightening the tightening screw 28'.

To dress the grinding wheel the tool is guided past the grinding wheel in a screwing motion.

For the manufacture of toothings with modified profile or for dressing a grinding wheel for such toothings the embodiments shown in FIG. 1 and 2 can be modified in such a manner that the individual gear flanks 14, 16 or 14', 16' are arranged on segment members separate from one another which can be tilted around the center axis of the tool and which can be set relative to one another in various positions. FIG. 5 shows such a modification of disc 10 where segment members 60, 61 of the disc containing flanks 14 and 16 are movably mounted on a shaft 64 by any known mounting means (not shown). Since larger portions of the flanks are embodied as involute surfaces than is necessary for the "active flank profile" of the toothing, another portion of the involute can become engaged as active flank profile with the grinding wheel by deviating the two flank parts assigned to a tooth space correspondingly, i.e. either towards each other or away from each other as the case may be. The tooth thickness of the workpiece gears may thus be varied while maintaining the same base circle.

Readjustments of the angle of the contact are also possible within a certain range by changing the distance between the axes of the grinding wheel and the truing tool and by adjusting the flank parts in accordance with the necessary tooth thickness.

Various modes of carrying out the invention are contemplated as being within the scope of the following claims particularly pointing out and distinctly claiming the subject matter which is regarded as the invention.

We claim:

1. A truing tool for the grinding wheel of a gear grinding machine for profile grinding helical spur gears, said truing tool when truing the grinding wheel being guided past the grinding wheel in the same manner as a workpiece gear when being ground, said truing tool comprising:

a disc-shaped member (10') presenting opposed planar side surfaces, at least one tooth space (12') being provided on the circumference of said member with truing flanks (14', 16') having surfaces (40) in the form of a section of the workpiece gear, said member having defined therein the root and crown cylinders associated with the workpiece gear, said flanks lying at an angle to the planar surfaces of said member in accordance with the angle of skew of the helical spur gear, each of said flanks utilizing that portion of the surface (40) lying between the intersections (52, 50) with a pair of planes, one of said planes (54) being tangent to the root cylinder (42) at a point where said surface (40) intersects said root cylinder, the other of said planes (56) being tangent to the root cylinder (42) at a point angularly displaced from said first point of tangency through a rolling angle $\rho$ so that said plane and said surface intersect the crown cylinder (44) at a common point, said flank surface portion being connected along its outer edge (50) to a uniaxially curved transition surface, the flanks of said tooth space opening into a bore located beneath the root cylinder, the diameter of which is larger than the closest distance between said flanks;

a strip of abrasive applied to said flank surfaces, said strip having the ends thereof affixed to said disc on either side of said tooth space and a central portion extending into said bore; and tightening means mounted in said bore and engaging said central portion of said strip, said means being radially movable to establish said strip taut on said flank surfaces.

2. A truing tool according to claim 1 wherein said disc-shaped member (10, 10') exhibits approximately the diameter of said workpiece gear and upon whose circumference several tooth spaces (12, 12') are arranged.

3. A truing tool according to claim 1 wherein said transition surface is the section of a cylinder.

4. A truing tool according to claim 1 wherein the ends of said strip (30) are fixed in position on the circumference of the disc-shaped member (10, 10') by means of clamping plates (20) capable of being screwed on.

5. A truing tool according to claim 1 wherein said tightening means includes clamping means for retaining said radially movable tightening means in a desired position.

6. A truing tool according to claim 5 wherein said retaining means is a tightening screw (28, 28') which extends from the center opening (26, 26') of the disc-shaped member (10, 10') in radial direction into a tap-hole of a clamp bolt (24, 24') included in said tightening means.

7. A truing tool according to claim 6 wherein said strip (30) runs in a loop around the clamp bolt (24) and exhibits a hole for the tightening screw (28).

8. A truing tool according to claim 6 wherein said clamp bolt (24') exhibits two surfaces which lie in the prolongation of the flanks (14', 16') and on each of which a projection (34) is arranged which engages in a correspondingly shaped opening on each end of a two-part strip.

9. A truing tool according to claim 8 wherein said projection (34) and said opening exhibit a circular cross-section.

10. A truing tool according to claim 1 wherein said flanks (14, 16) assigned to a tooth space (12) are arranged on disc segments (60, 62) which can be tilted towards each other away from each other around the center axis of the base cylinder and which can be adjusted for various tooth space widths.

* * * * *